Patented Oct. 19, 1937

2,096,377

UNITED STATES PATENT OFFICE 2,096,377

MANUFACTURE OF BUTYL ALCOHOL, ACETONE, AND ISOPROPYL ALCOHOL

James F. Loughlin, New York, N. Y.

No Drawing. Application December 27, 1932, Serial No. 648,985. Renewed December 26, 1935

27 Claims. (Cl. 195—44)

This invention relates to the manufacture of solvents by fermentation with a culture of bacteria which ferments sugary or saccharified mashes to produce butyl alcohol, isopropyl alcohol, acetone, carbon dioxide, and hydrogen, but does not readily and actively ferment cereal-starch mashes unaided to produce any substantial amount of solvents.

It is among the objects of the invention to provide for regulating the fermentation with the particular species of organism, which will hereinafter be described, to produce large yields of solvents.

Another object of the invention is to regulate the fermentation to produce solvent yields consisting of a preponderance of butyl alcohol either with a relatively large amount of isopropyl alcohol and a small amount of acetone, or a large amount of acetone and a small amount of isopropyl alcohol.

Pure cultures of certain organisms which ferment carbohydrate mashes and produce solvents such as those mentioned, are commonly capable of producing only a given and definite split-up of solvents when the fermentations are complete. The species of organism used according to the present invention is capable of being influenced to produce not only good yields of solvents but with different split-ups as the initial conditions of the mashes are varied. The term, "complete fermentation" refers to a fermentation, such as a normal fermentation, in which the mash is fermented out until the maximum sugar consumption is obtained and the organism has become inactive chiefly from the inhibiting effect of the solvents produced or by lack of sufficient assimilable nutrient to sustain activity.

A characteristic of a normal fermentation with pure cultures of organisms which produce butyl alcohol and acetone or butyl alcohol and isopropyl alcohol is a rapid increase in the titratable acid in approximately the first 15 to 24 hours after inoculation to a high acid value, say 2.0 to 3.5 cc. of tenth normal titratable acid per 10 cc. of mash, followed by a relatively rapid drop to approximately or sometimes slightly below the initial value, and then only a small increase or no increase in the titratable acid during the remainder of the fermentation until the fermentation practically stops chiefly by reason of the inhibiting effect of the solvents on the organism or by lack of sufficient assimilable nutrient to sustain activity. The first mentioned rise and fall of titratable acid commonly develops during about one-third to one-half of the time for complete fermentation.

The organism of the present invention is a spore forming anaerobic bacterium, that is, if a fermentable medium is substantially free of dissolved oxygen and it is inoculated with a culture which contains only spores and the culture has been suitably heat shocked, the spores readily germinate and develop into an active culture, but if the entire medium contains an excess of dissolved oxygen, the spores seldom germinate, if at all. No growth is obtained with pure cultures of this species of organism, aerobically on the surface of a solid glucose-agar medium. This species of organism closely resembles in appearance various other organisms which produce butyl alcohol and other solvents, for example Clostridium Americanum (Pringsheim) but in one respect it is distinguished from this organism in that more than 5% of acetone is usually produced in normal fermentations of sugary mashes having either high or low pH values. In low pH mashes this species of organism works well and produces small amounts of isopropyl alcohol, say 1.5% to 2% and usually more than 20% acetone. Other distinguishing characteristics of this species of organism are that it does not liquefy gelatine. It ferments glycerol well. Unaided, it does not ferment cereal-starch mashes well. Unaided, no appreciable solvents are produced from the starch contained in sterilized grain mashes by this species of organism. The spores are resistant to heating in that they survive a shock test of about 15 minutes at 85° C. The optimum temperature for fermentation is between 30° and 40° C., say about 36° C. After inoculation with an active culture and with favorable conditions for growth, the organism vigorously establishes its own anaerobiosis. Therefore a complete exclusion of air from and above the mash is unnecessary although the organism works well if the mash is free of dissolved oxygen.

The organism may be derived from potatoes, grains, and other products which grow in or above the soil, pure cultures being obtained by subculturing in media containing substances which are favorable to the growth of the organism as indicated herein and by methods of isolation and sub-culturing well known to the art.

In order to facilitate the identification of this organism, it will be described with the aid of the Descriptive Chart of the Society of American Bacteriologists.

Name—"Clostridium Saccharobutyl-Isopropyl-acetonicum."

Source—potato.

I. Morphology

1. Vegetative cells, Motile.
   Medium used—potato and dextrose.
   pH of medium=7.0 at time of inoculation.
   Age=18 hours.
   Temperature=36° C.
   Form—long and short rods; chain formation.
   Size=Approximately 2–12 microns long and .7–1.2 microns wide } unstained.
   Ends—rounded.
   Stain—Iodine=granulose positive in old cells.

2. Sporangia.
   Medium used—potato and dextrose.
   pH=7.0 at time of inoculation.
   Age=48 hours.
   Form=oval.
   Spores=sub-terminal.
   Limits of size } = { Approximately 1.8–2.3 microns long and 1.4–1.9 microns wide } unstained.

II. Cultural features

1. Nutrient agar stab.
   Age=5 days.
   Temperature=36° C.
   Growth=none aerobically.
   Growth=anaerobically—fair, best at bottom.
   Color=cream.
   Odor=none observed.

III. Physiology

1. Optimum temperature=30°–40° C.
2. Optimum pH of cane molasses medium=approx. 4.0–6.0.
3. Gelatine stab=no liquefaction in 40 days.
4. Anaerobic organism.
5. Gas formed=$CO_2$ and $H_2$.
6. Fermentation tests:
   a. Fermented with avidity:—Gas formation—arabinose, dextrine, galactose, lactose, levulose, maltose, mannose, sucrose, xylose, glucose.
   b. Fermented after extended period:—Gas formation—glycerol, glycogen, inulin, mannitol, melezitose, a-methyl-glucoside, raffinose, salacin, trehalose.
   c. Fermented poorly:—Soluble starch (started gassing or fermenting after 14 days incubation), starch bearing materials such as corn, rye, wheat, rice, barley.
   d. Did not ferment in 85 days:—cellulose, quercitol, erythritol, rhamnose.

It is, of course, to be understood that minor variations in gas formation in such tests may occur with different strains or with the same strain of an organism of this species depending inter alia on the age of the culture and the cultural conditions to which the organism has been subjected.

The gelatine liquefaction test was made on a 10.8% "Bacto-nutrient gelatine" solution containing 0.25 gram glucose per 100 cc. of the solution. "Bacto-nutrient gelatine" is a nutrient material comprising three parts beef extract, five parts peptone, and one hundred parts gelatine. The tests were made with active twenty-hour cultures. The tubes gassed well but no liquefaction was observed even after 40 days incubation at about 35° C.

The following specific embodiments of the invention are mentioned as being representative of the manner of practicing the invention. The term, butyl alcohol-acetone-isopropyl organism in the specification and claims refers to the organism described herein and named by me Clostridium Saccharobutyl-Isopropyl-Acetonicum.

*Example 1.*—A 5% sugar solution was made by adding 15 kilos of blackstrap molasses to about 149 liters of water. A nutrient consisting of 300 grams of malt sprouts was added and sulphuric acid was added to bring the titratable acid of the mash after sterilization to about 2.1 cc. tenth normal titratable acid per 10 cc. of mash and the pH value to about 4.5. The mash was sterilized by boiling 20 minutes and by pressure cooking 40 minutes with steam at 20 pounds pressure and cooled to 36° C. The sterile mash was inoculated with an active culture of the butyl alcohol-isopropyl-acetone organism. The volume of culture was about 2⅓% of the volume of the mash. A normal fermentation ensued and was completed in about 48 hours. The solvents were removed from the mash and separated by distillation. The sugar consumption was 85%, the yield of solvents was 29% of the weight of sugar mashed and 34% of the sugar consumed. The solvents consisted of about 64% butyl alcohol, 34% acetone, and 2% isopropyl alcohol.

*Example 2.*—A similar molasses mash having a pH of about 4.5 and containing 7% sugar was likewise sterilized, inoculated and fermented. The fermentation required about the same number of hours and the split-up of solvents was about the same as in Example 1. The sugar consumption was about 65% of the sugar mashed and the yield was about 22% of the sugar mashed and about 34% of the sugar consumed.

*Example 3.*—A solution containing 5% sugar was made by adding molasses to water. Nutrient was added as in Example 1 and the titratable acid and pH of the mash were adjusted to give a titratable acid of about 1.5 cc. and a pH value of about 5.5 after sterilization and cooling to about 36° C. The fermentation was completed in about 72 hours and the sugar consumption was about 70%. The solvents consisted of 75% butyl alcohol, 20% isopropyl alcohol and 5% acetone amounting to a yield of 25% of the total sugar mashed and 33% of the sugar consumed. A similar mash, except that it contained 7% sugar, gave about the same split-up of solvents but lower sugar consumption.

The most rapid fermentations and the best yields of solvents are generally obtained with this organism on mashes containing Cuban cane molasses which are adjusted to low pH values, that is, pH values under about 5.5. In these low pH fermentations butyl alcohol and acetone are the main solvents although isopropyl alcohol is present from traces up to about 10% of the solvents. About 60% to 70% butyl alcohol and 30% to 38% acetone are produced in molasses mashes with pH values between about 4 and 5.3 provided ample nutrient material is present either as an added protein material or as a naturally occurring ingredient of the mash material. With these low pH mashes, higher sugar consumptions and yields are obtained than with mashes of high pH value when other conditions of fermentation are similar. Molasses mashes with pH values up to about 8 can be used, but with the low pH mashes more rapid fermentations are produced than with the higher pH values. With low pH values the time of fermentation is between about 48 and 72 hours, whereas periods of 65 to 100 hours are required to complete the fermentations of similar mashes with higher pH values.

The solvents produced in the higher pH mashes contain about 65% to 80% butyl alcohol, 10% to 30% isopropyl alcohol, and a few per cent up to about 20% acetone. The smallest amounts of acetone are usually produced with the highest pH mashes, particularly in the absence of inorganic nitrogen compounds. As a general rule the relative proportion of alcohols can be increased and the relative proportion of acetone can be decreased with increased pH values.

The described reaction of the organism to the pH value of the mash, particularly in the absence of any substantial amount of inorganic nitrogen-containing materials, is a remarkably definite characteristic of the herein described organism. Varying the pH value of the mashes provides a means of widely varying the yields of acetone and isopropyl alcohol while maintaining high yields of butyl alcohol. By varying the pH value of the mash, the solvent production can be varied to meet the demands of other processes and the commercial value of the combined solvents produced by the organism can be varied. As compared with a production unit in which two organisms were used heretofore to produce large yields of isopropyl alcohol, acetone, and butyl alcohol, the process provides the practical advantage of utilizing cultures of only one organism in one fermentation equipment, and of varying the production of acetone and isopropyl alcohol by adjustments of the mash while maintaining a high sugar consumption and a high over all efficiency.

This species of organism works well in mashes containing 2% to 7% sugary material or even more. Molasses solution is a suitable raw material but other sugary materials such as maltose, dextrose, and dextrine or materials which contain these substances can be used. The term, "sugary" in the specification and claims refers to substances, such as sucrose, dextrose, levulose, and to hydrolyzed carbohydrates which resemble sugars and may be considered as sugars, such as dextrine, inulin and syrups containing sugary substances which are fermentable in water solution by the action of the described species of organism with favorable conditions for growth. The term is intended to distinguish from cereal-starchy materials, grains, and the like which are not completely liquefied by the described species of organism and cannot be economically fermented by it without aid such as being converted into the form of sugary carbohydrates. The starch in mashes composed solely of cereal-grain and water which is sterilized under 20 pounds steam pressure for one hour is not fermented well and the starch does not produce any appreciable amount of solvents by the action of this species of organism. Although a slight gassing could be observed after an extended incubation of such starch mashes, a material amount of solvent was not produced.

An ample supply of assimilable nutrient material to supply proteins for the growth of this species of organism is necessary. The nutrient material is sometimes present in ample amounts in sugary materials, for example in beet molasses. Various nutrient materials, such as proteins of animal or vegetable origin which may be found in or derived from, by degradation or hydrolization, if necessary, potato, corn gluten, rye, barley, wheat, rice, beet pulp, soy bean meal, copra meal, cotton seed meal, casein, linseed meal, malt sprouts, slaughter house tankage, sewage sludge, bone meal, ethyl alcohol slop or degraded yeast, and other protein-containing or nitrogenous materials can be added, or urea can be used. In the specification and claims the terms, protein material, nitrogenous material and nutrient are intended to refer to urea as well as to other nutrient materials such as those which have been mentioned. A large excess of protein material can be present but it is unnecessary to provide more than an ample amount to support good growth of the organism.

The fermentation can be hastened and the sugar consumption can be increased by adding relatively small amounts of salts or materials comprising inorganic ammonium compounds, such as ammonia or the sulphate, carbonates, chloride, phosphates, acetate, lactate, hydroxide, butyrate of ammonium, and other ammonium compounds. Urea can also be used instead of or in conjunction with inorganic ammonium materials to hasten the fermentation and vary the split-up. Less butyl alcohol and more of the lower boiling solvents, particularly acetone, are produced by adding inorganic ammonium materials. Small amounts of water-soluble inorganic ammonium materials are sufficient, say about 0.0002% to 0.1% by weight of the mash (as ammonia) or more may be used. Thus urea can be used instead of or to supplement proteins of vegetable or animal origin, and it can be used to supplement or as a substitute for compounds of ammonia.

For a given pH value the titratable acidity of mashes of different concentration or of different mash material may vary somewhat. Values between about 0.2 cc. to 2.5 cc. titratable acid per 10 cc. of mash correspond to pH values of about 7 down to 4. However, the titratable acid may be more or less than the stated values if the pH values are properly regulated. The pH value and titration value may be regulated by adding organic or inorganic acids to lower the pH value, or by adding alkaline substances, such as alkali or alkaline earth oxide, hydroxide or carbonate to raise the pH value, and in molasses-containing mashes by varying the proportions of beet and cane molasses.

Ammonia, or alkaline ammonium compounds, can likewise be utilized for this purpose.

Although the invention has been explained with reference to various specific examples, it is to be understood that it is not specifically limited thereto. For example, organic nutrients, preferably degraded or hydrolyzed, and substances containing inorganic nitrogen can be added to or excluded from any of the described mashes; mashes containing other sugary substances can be fermented; variations in the described optimum conditions can be made as these conditions are affected by changes in the concentration and kinds of raw materials used to make the mashes, and the concentration of the sugary substance in the mash can be varied within broad limits and additions to the mashes may be made before or shortly after fermentation has started.

I claim:

1. The process of manufacturing normal butyl alcohol, acetone and isopropyl alcohol which comprises inoculating a mash comprising essentially a water solution of a fermentable non-cereal starch carbohydrate and assimilable protein with a pH value of between 4.0 and 8.0 with a bacterial culture containing anaerobic spore-forming bacteria of the species clostridium saccharo-butyl-isopropyl-acetonicum and allowing the mash to ferment at a temperature sufficient to bring about active fermentation by the action of said bacterial culture.

2. The method of manufacturing normal butyl alcohol, acetone, and isopropyl alcohol which comprises bringing fermentable sugary material and assimilable protein into solution with water to provide a mash, inoculating the mash with a bacterial culture containing anaerobic spore-forming bacteria of the species clostridium saccharo-butyl-isopropyl-acetonicum, adjusting the pH value of the mash during fermentation to between 4.0 and 7.0 and allowing the mash to ferment at a temperature sufficient to bring about active fermentation by the action of said bacterial culture.

3. The method of manufacturing normal butyl alcohol, acetone and isopropyl alcohol which comprises preparing a molasses mash containing assimilable protein, inoculating the mash with a bacterial culture containing anaerobic spore-forming bacteria of the species clostridium saccharo-butyl-isopropyl-acetonicum, adjusting the pH value of the mash during fermentation to between about 4.0 and 7.0 and allowing the mash to ferment at a temperature sufficient to bring about active fermentation, by the action of said bacterial culture.

4. The method of manufacturing normal butyl alcohol, acetone and isopropyl alcohol which comprises preparing a fermentable mash containing water, assimilable protein and fermentable sugary material, adjusting the pH value of the mash to between 4.0 and 8.0, inoculating the mash with a bacterial culture containing anaerobic spore-forming bacteria of the species clostridium saccharo-butyl-isopropyl acetonicum and allowing the mash to ferment at a temperature sufficient to bring about active fermentation by the action of said bacterial culture.

5. The method of manufacturing normal butyl alcohol, acetone and isopropyl alcohol by fermentation of a sugary mash which comprises making a mash comprising essentially a solution of a fermentable sugary material, assimilable protein material, and water, adjusting the pH value of the mash between about 4.0 and 7.0 and the acidity between 0.0 cc. to about 2.5 cc. of tenth normal titratable acid per 10 cc. of mash, inoculating with a bacterial culture containing anaerobic spore-forming bacteria of the species clostridium saccharo-butyl-isopropyl-acetonicum and allowing the mash to ferment at a temperature sufficient to bring about active fermentation by the action of said bacterial culture.

6. The method of accelerating the fermentation and increasing the yield of solvents produced in the fermentation of fermentable non-cereal starch carbohydrate mashes containing assimilable protein which are inoculated with a bacterial culture containing anaerobic spore-forming bacteria of the species clostridium saccharo-butyl-isopropyl-acetonicum and are fermented by the action of said culture, which comprises adding to the mash about 0.0002% to about 0.1% by weight of the mash calculated as ammonia of a water-soluble inorganic nitrogen containing material and bringing the hydrogen-ion concentration of the mash to a pH value between about 4.0 and 7.0.

7. The method in accordance with claim 6 wherein the inorganic nitrogen-containing material is selected from a group consisting of ammonia, ammonium compounds and urea.

8. The method in accordance with claim 4 wherein the pH value of the mash is adjusted by the addition of an acid to the mash.

9. The method in accordance with claim 4 wherein the pH value of the mash is adjusted by the addition of an alkaline material to the mash.

10. The method in accordance with claim 4 wherein the pH value of the mash is adjusted by the addition of an alkaline material selected from a group comprising ammonia and the hydroxides and carbonates of ammonium, alkali metals and alkaline earth metals to the mash.

11. The method in accordance with claim 4 wherein the pH value of the mash is adjusted to between about 4.0 and about 5.3.

12. The process in accordance with claim 4 wherein the pH value of the mash is adjusted to between about 5.3 and about 8.0.

13. The process in accordance with claim 2 wherein the fermentable sugary material comprises substantially monose sugars.

14. The process in accordance with claim 2 wherein the fermentable sugary material comprises inverted molasses.

15. The process in accordance with claim 1 wherein a small amount of inorganic nitrogen-containing material selected from the group consisting of ammonia, ammonium compounds and urea is added to the mash.

16. The process in accordance with claim 1 wherein the pH value of the mash is adjusted to between about 4.0 and 5.3 for increasing the yield of acetone.

17. The process in accordance with claim 6 wherein the pH value of the mash is adjusted to between about 4.0 and 5.3 for increasing the yield of acetone.

18. The process in accordance with claim 1 wherein the pH value of the mash is adjusted to above 5.3 and below 8 for increasing the yield of alcohols.

19. The process in accordance with claim 6 wherein the non-cereal starch carbohydrate is molasses.

20. An inoculum comprising essentially a bacterial culture of the species clostridium saccharo-butyl-isopropyl-acetonicum and a medium which contains fermentable sugary material, assimilable protein, and a small amount of water-soluble inorganic nitrogen-containing material and which has a pH value between 4.0 and 8.0.

21. An inoculum as defined in claim 20 in which the bacterial culture is active.

22. An inoculum as defined in claim 20 in which the bacterial culture is substantially in the spore form.

23. An inoculum as defined in claim 20 in which the medium contains molasses and the water-soluble inorganic nitrogen-containing material is present in an amount from about 0.0002% to about 0.1% by weight of the mash calculated as ammonia.

24. The process in accordance with claim 2 wherein the pH value of the mash is adjusted by the addition of alkaline earth carbonate.

25. The process in accordance with claim 4 wherein the pH value of the mash is adjusted by the addition of alkaline earth carbonate.

26. The method in accordance with claim 2 wherein the pH value of the mash is adjusted by the addition of alkaline earth carbonate and wherein a small amount of ammonium phosphate is added to the mash.

27. The method in accordance with claim 4 wherein the pH value of the mash is adjusted by the addition of alkaline earth carbonate and wherein a small amount of ammonium phosphate is added to the mash.

JAMES F. LOUGHLIN.

CERTIFICATE OF CORRECTION.

Patent No. 2,096,377.   October 19, 1937.

JAMES F. LOUGHLIN.

It is hereby certified that error appears in the printed specification of the above numbered patent requiring correction as follows: Page 4, second column, lines 28 and 31, claims 13 and 14 respectively, for the claim reference numeral "2" read 4; and that the said Letters Patent should be read with these corrections therein that the same may conform to the record of the case in the Patent Office.

Signed and sealed this 25th day of January, A. D. 1938.

Henry Van Arsdale,
Acting Commissioner of Patents.

(Seal)